(12) United States Patent
Matikainen et al.

(10) Patent No.: US 11,434,077 B2
(45) Date of Patent: Sep. 6, 2022

(54) ARRANGEMENT AND A METHOD FOR HANDLING TYRES AND A HIGH BAY WAREHOUSE

(71) Applicant: PESMEL OY, Kauhajoki (FI)

(72) Inventors: Jani Matikainen, Nummela (FI); Tony Leikas, Teuva (FI)

(73) Assignee: PESMEL OY, Kauhajoki (FI)

( * ) Notice: Subject to any disclaimer, the term of this patent is extended or adjusted under 35 U.S.C. 154(b) by 121 days.

(21) Appl. No.: 16/762,812

(22) PCT Filed: Nov. 7, 2018

(86) PCT No.: PCT/FI2018/050819
§ 371 (c)(1),
(2) Date: May 8, 2020

(87) PCT Pub. No.: WO2019/092316
PCT Pub. Date: May 16, 2019

(65) Prior Publication Data
US 2021/0362952 A1    Nov. 25, 2021

(30) Foreign Application Priority Data
Nov. 8, 2017   (FI) ..................................... 20176001

(51) Int. Cl.
*B65G 1/137*    (2006.01)

(52) U.S. Cl.
CPC .... *B65G 1/1375* (2013.01); *B65G 2201/0273* (2013.01)

(58) Field of Classification Search
CPC combination set(s) only.
See application file for complete search history.

(56) References Cited

U.S. PATENT DOCUMENTS

| 4,306,826 A * | 12/1981 | Detwiler | B29D 30/0016 118/320 |
| 4,555,067 A * | 11/1985 | Angelucci | B65H 54/26 242/473.4 |
| 5,655,870 A * | 8/1997 | Yasuhara | B65G 1/1371 242/533 |

FOREIGN PATENT DOCUMENTS

| CN | 202346272 U | 7/2012 |
| CN | 203938074 U | 11/2014 |

(Continued)

OTHER PUBLICATIONS

International Search Report for PCT/FI2018/050819 dated May 2, 2019.

(Continued)

*Primary Examiner* — Kyle O Logan
(74) *Attorney, Agent, or Firm* — Thomas | Horstemeyer LLP

(57) ABSTRACT

The present invention relates to an arrangement for handling one or more tyres simultaneously in storage shelving of a high bay warehouse, where the tyres are brought in and stored and from where the tyres are taken. The arrangement according to the invention comprises a shelving track and a load handling device arranged to move along the shelving track, which load handling device comprises a horizontal longitudinal picking bar having a first end and a second end and which longitudinal picking bar is arranged to handle one or more tyres simultaneously in an axial direction of the tyres when the tyres stand in upright position one after the other so that the longitudinal picking bar is arrangeable to the centre of the tyre, and a rear support arranged to the longitudinal picking bar. The present invention also relates to a method for handling tyres and a high bay warehouse.

15 Claims, 4 Drawing Sheets

(56) References Cited

FOREIGN PATENT DOCUMENTS

| | | | |
|---|---|---|---|
| CN | 104444958 | A | 3/2015 |
| CN | 107009361 | A | 8/2017 |
| EP | 0310159 | A1 | 4/1989 |
| JP | S9940732 | B2 | 10/1984 |
| JP | S63185708 | A | 8/1988 |
| JP | H10310202 | A | 11/1998 |
| JP | 2002145025 | A | 5/2002 |
| KR | 20030096699 | A | 12/2003 |
| SU | 775047 | A2 | 10/1980 |

OTHER PUBLICATIONS

Finnish Search Report for 20176001 dated May 21, 2018.
Search Report issued by China Patent Office, CN Patent Application No. 2018800855383, dated May 20, 2021.

* cited by examiner

ARRANGEMENT AND A METHOD FOR HANDLING TYRES AND A HIGH BAY WAREHOUSE

CROSS-REFERENCE TO RELATED APPLICATIONS

This application is the 35 U.S.C. § 371 national stage application of PCT Application No. PCT/FI2018/050819, filed Nov. 7, 2018, where the PCT claims priority to, and the benefit of, Finnish application no. 20176001, filed Nov. 8, 2017, both of which are herein incorporated by reference in their entireties.

FIELD OF THE INVENTION

The present invention relates to an arrangement and a method for handling tyres according to the preambles of the appended independent claims. The invention also relates to a high bay warehouse comprising an arrangement according to the invention.

BACKGROUND OF THE INVENTION

Various systems for handling and storing tyres in a warehouse are known in the prior art. In a typical warehouse, the tyres are stored in piles, stacked on top of each other. In which case, the sidewalls of the tyres are substantially parallel to the base on which the tyres are stacked. The piles of tyres are stored, for example, in tyre storage racks on pallets or at floor storages. In a conventional warehouse, the pallets are handled manually with forklifts. Alternatively, the tyres are handled with automated handling systems arranged above a stocking area for storing the tyres. An automated warehouse of this kind is presented in the publication U.S. Pat. No. 6,315,513.

The disadvantage of storing tyres in piles, stacked on top of each other, is that the tyres may collapse during storing. In consequence of the collapsing, the dimensioning of the tyres alternates in a width direction of the tyres. This may disturb the operation of the automated handling systems, because in a case when the tyres are in piles, stacked on top of each other, the picking of the tyres on the basis of the nominal size of the tyres works only up to about one meter from the top of the pile without sensing. So, in practice, the special identification or sensing in the automated handling systems is mandatory. Sensing of the automated handling systems increases costs and involves problems with the reliability of the automated handling of the tyres. Another disadvantage of storing tyres in the piles is that the pile could be unstable when the height of the pile grows. It is difficult to store and handle different kinds and sizes of tyres stacked on top of each other. Because of these, there must be several smaller piles in the warehouse, in which case, more floor space is needed.

Additionally, in a typical handling and storing solution for tyres relating to the tyre manufacturing, intermediate storages or buffer storages are needed for receiving incoming tyres from the production. Further, a separate picking area is required for picking and sending the tyres out of the storage, to which picking area the pallets or racks comprising tyres as needed for order are retrieved. These intermediate steps and conveying the pallets or racks slow down the overall handling process of the tyres in the warehouse.

OBJECTIVES OF THE INVENTION

It is an object of the present invention to reduce or even eliminate the above-mentioned problems appearing in the prior art.

Indeed, an object of the present invention is to provide a novel arrangement and a method for handling tyres in a high bay warehouse in a simple and more efficient way.

It is also an object of the present invention to provide an arrangement and a method for handling tyres in a high bay warehouse, which increases the capacity of the warehouse, i.e. the tyres can be stored more per square metre than previously.

Another object of the present invention is to provide a high bay warehouse in which handling of tyres is reliable and effective. It is also an object of the present invention to provide a high bay warehouse in which efficient storing and simple collecting of the tyres as well as handling of the customer's orders are integrated.

In order to achieve among others the objects presented above, the invention is characterized by what is presented in the characterizing parts of the enclosed independent claims. Some preferred embodiments of the invention are described in the dependent claims.

The embodiments and advantages mentioned in this text relate, where applicable, both to the arrangement, the method as well as to the high bay warehouse according to the invention, even though it is not always specifically mentioned.

DESCRIPTION OF THE INVENTION

A typical arrangement according to the present invention for handling one or more tyres simultaneously in storage shelving of a high bay warehouse, where the tyres are brought in and stored and from where the tyres are taken, comprises a shelving track and a load handling device arranged to move along the shelving track, which load handling device comprises a horizontal longitudinal picking bar having a first end and a second end and which longitudinal picking bar is arranged to handle one or more tyres simultaneously in an axial direction of the tyres when the tyres stand in upright position one after the other so that the longitudinal picking bar is arrangeable to the centre of the tyre, and a rear support arranged to the longitudinal picking bar.

A typical method according to the present invention for handling one or more tyres simultaneously in storage shelving of a high bay warehouse, where the tyres are brought in and stored and from where the tyres are taken comprises handling of one or more tyres simultaneously by using an arrangement according to the invention so that the last tyre in the longitudinal direction of the longitudinal picking bar is handled so that the second end of the longitudinal picking bar reaches between the tyre beads, and the rear support supports the tyre.

A typical high bay warehouse according to the invention comprises a plurality of storage positions organised in storage shelving, a plurality of tyres or set of tyres arranged in at least some of the storage positions so that the tyres are arranged directly on the rack structure of the storage shelving in upright position one after the other, a stacker crane arranged to move at least two, preferably four directions, and at least one arrangement according to the invention arranged to the stacker crane for handling one or more tyres simultaneously in an axial direction of the tyres.

It has been surprisingly found that the tyres can be stored and easily handled in an axial direction of the tyres when the tyres stand in upright position one after the other on a storage shelving of a high bay warehouse. With the axial direction of the tyres is here meant a direction of a central axis of the tyres, the central axis of the tyres being horizontally oriented. The upright position refers to a position where the central axis of the tyre is in horizontal direction. The handling can be carried out in a simple way by using a load handling device which is arranged to move along the shelving track in a direction parallel to the axial direction of the tyres when the tyres stand in upright position one after the other. The load handling device comprises a horizontal longitudinal picking bar having a first end and a second end, and a rear support arranged to the longitudinal picking bar. The horizontal longitudinal picking bar is arranged to handle one, two or more tyres simultaneously in an axial direction of the tyres when the tyres stand in upright position one after the other so that the horizontal longitudinal picking bar is arrangeable to the centre of the tyre. The centre of the tyres opens horizontally in such a manner that the longitudinal picking bar can be moved horizontally through the centres of the tyres and picked the tyres in their axial direction. The inner surface of the centre of the tyre i.e. tyre bead is freely in contact with the longitudinal picking bar without fastening or pressing of the tyre, i.e. the tyre to be picked up is freely hanged on the longitudinal picking bar. In that case, stress directed towards the tyres when handled can be minimised. With the arrangement according to the invention different kinds and sizes of tyres can be handled simultaneously. It has been observed that the construction of the load handling device can be the simple horizontal longitudinal picking bar with the rear support, since the rear support is adequate to support the tyres in the longitudinal picking bar during the handling and the lifting of the tyres.

In a high bay warehouse for tyres, the storage is organized in shelves where the storage positions are next to one another and top of one another. The storage positions are such that at least two tyres and preferably more than one tyre can be placed in each storage position. The tyres are placed into the storage positions in an axial direction one after to another in such a manner that the tyres stand in upright position and the sidewall of the only one tyre is visible from each storage position. Preferably, the sidewalls of the tyres touch to each other and there is no gap between the tyres. The storage positions can be, for example, arranged as a shelf having a height and width as well as depth. In such a configuration, the tyres can be arranged in upright position one after the other in the depth direction of the storage shelf. According to an embodiment of the invention, the storage shelves are inclined so that they slope down in a depth direction of the shelves. The inclination can be for example 2°. This prevents the tyres to fall over or of the shelf. Preferably, the storage shelf comprises a rack structure on which the tyres are directly arranged. Thus, the separate pallets or racks for storing the tyres are not needed.

According to an embodiment of the invention, the storage positions are preferably accessible through only one side, which is designated as the output of the storage position. The output of the storage position is thus the location from which the horizontal longitudinal picking bar of the load handling device can enter the storage position for picking up or for positioning one or more tyres.

The arrangement according to the invention comprises a load handling device. The load handling device is arranged to move in at least two opposite directions along the shelving track, such as back and forth. The shelving track is preferably elongated in a direction parallel to the depth direction of the storage positions. Preferably, the load handling device is arranged to move in depth direction of the storage positions. Preferably, the arrangement comprises also means for moving the load handling device such as motor connected to it.

The load handling device comprises a horizontal longitudinal picking bar having a first end and a second end. The longitudinal picking bar is arranged to the main body of the load handling device from its first end in such a manner that the length direction (the direction between the first and the second end) of the longitudinal picking bar is substantially perpendicular to the main body of the load handling device. The horizontal longitudinal picking bar is preferably a straight in whole length. The horizontal longitudinal picking bar may be, for example, an axial bayonet with fixed length. The longitudinal picking bar may also be arranged to move in at least two opposite directions, such as up and down. With the longitudinal picking bar, the tyres can be easily picked from and positioned to the storage positions. The tyres can be picked from the storage position in the axial direction when the tyres stand in upright position one after the other.

When picking the tyres from the storage position, the load handling device is first moved forward along the shelving track in a direction parallel to the depth direction of the storage position. At the same time, the longitudinal picking bar moves horizontally through the centre of the tyres standing in upright position one after the other. After positioning the longitudinal picking bar through the centre of the tyres to be picked, the longitudinal picking bar is moved up. The tyres stay hanging freely from their inner surface on the longitudinal picking bar one after the other preferably so that the sidewalls of the tyres touch to each other. The load handling device is then moved backwards along the shelving track.

According to an embodiment, a length of the horizontal longitudinal picking bar may be in the range of 1-4 meters. More preferably the longitudinal picking bar has been dimensioned so that it can reach to the end of the storage position in the depth direction. According to an embodiment of the invention, the longitudinal picking bar has a fixed length. Alternatively, according to another embodiment of the invention, the length of the horizontal longitudinal picking bar has arranged to be adjustable. The longitudinal picking bar may be, for example, telescopic. Adjustable length of the longitudinal picking bar facilitates and speeds up picking and handling of the tyres. The length of the longitudinal picking bar may be adjusted in compliance with the number of handled tyres. By adjusting the length of the longitudinal picking bar, the tyres can also be moved against the rear support. A diameter of the longitudinal picking bar is smaller than the inner diameter of the tyre to be handled.

The load handling device comprises also a rear support arranged to the horizontal longitudinal picking bar. According to an embodiment of the invention the rear support has a plate like structure and it has arranged substantially perpendicular to the length direction of the horizontal longitudinal picking bar. When the tyres are picked and handled, the rear support is arranged against the sidewall of the first picked tyre. The rear support keeps the tyres in their upright position at the longitudinal picking bar during handling and lifting of the tyres and prevents them from falling. The rear support provides a stable method for handling tyres with a simple horizontal longitudinal picking bar. The size of the rear support may be adjustable, for example with extension plates, in which case, the rear support can be fitted with the size of the tyres to be handled. The rear support may comprise a detecting plate which detects the contact of the tyre during picking. The detecting plate enables the load handling device to pick the correct number of tyres.

According to one preferred embodiment of the invention, the rear support has arranged to be movable in the longitudinal direction of the horizontal longitudinal picking bar. The longitudinal i.e. length direction of the longitudinal picking bar refers to a direction between the first and the second end of the longitudinal picking. Thus, the position of the rear support can be altered on the basis of the number and/or nominal size of the tyres to be handled. The rear support may be arranged to be automatically moved on the basis of the number and/or the nominal size of the tyres to be handled. The movable rear support enables adjustability of the load handling device and assures a good support for the tyres despite of the number and/or size of tyres. The rear support may be, for example, a plate like structure having a plain supporting surface. The supporting surface against the tyres is preferably larger than the inner diameter of the tyre. The movements of the rear support can be controlled, for example, with a motor.

In a preferred embodiment of the invention, the arrangement comprises a horizontal longitudinal picking bar having a fixed length and a rear support which is arranged to be movable in the longitudinal direction of the longitudinal picking bar.

According to another embodiment of the invention, a size of the rear support has arranged to be adjustable in a height direction, i.e. the direction which is perpendicular to the length direction of the horizontal longitudinal picking bar. The size of the rear support may be adjustable according to the size of the tyre. The size of the rear support may be adjusted, for example, with extension plates which can be arranged to a lower part of the rear support. The extension plates can be movable, in which case they can be turned in place (to be as an extension to the rear support) and away depending on the need for support. Adjustability of the size of the rear support in a height direction enables the load handling device to handle any kinds and size of tyres.

The horizontal longitudinal picking bar may also comprise a support plate arranged to the second end of the longitudinal picking bar. The support plate may be a plate like structure arranged substantially perpendicular to the length direction of the longitudinal picking bar. When picking and handling the tyres, the support plate is to be arranged between the tyre beads, preferably, in the middle of the tyre in the width direction of the tyre. The support plate may aid the load handling device to separate the tyres stored one after the other.

In addition, the arrangement according to the present invention comprises a required actuating system for controlling the movements of the load handling device. The actuating system is typically a computer and an associated program.

The arrangement according to the invention enables simple and reliable handling of many tyres at the same time. The load handling device handles the tyres in an axial direction of the tyres when the tyres stand in upright position one after the other by arranging the horizontal longitudinal picking bar to the centre of the tyres and supporting the tyres with the rear support. The load handling device may handle 1 to 20 tyres at the same time. Typically, the load handling device handles two or more tyres simultaneously. Preferably, the number of tyres handled simultaneously is at the maximum of 20. The tyres can be picked up from and drop off to different storage positions. The tyres handled by the present arrangement can be any kind of tyres. The arrangement according to the invention enables different kind of tyres, i.e. having a different nominal size or different inner diameter, to be handled at same time. Due to this a separate classifying of the tyres is not needed.

The arrangement may comprise at least one load handling device arranged to move along the shelving track. According to an embodiment of the invention, the arrangement comprises two or more load handling devices arranged to move along the shelving track. In that case, both load handling devices are moving along their own shelving track. The shelving tracks may be located next to each other so that the distance of the load handling devices moving along the shelving tracks remains essentially constant. In a preferred embodiment of the invention, the arrangement comprises two shelving tracks and load handling devices arranged parallel to each other. The advantage of having two load handling devices is that more tyres can be handled at the same time and sorting of the tyres can be done in the storage shelving.

According to an embodiment of the invention, the arrangement comprises a supporting rack on which the tyres handled by the load handling device can be temporarily laid down. The supporting rack is preferably located to the both sides of the shelving track. The length of the supporting rack is substantially same as the length of the shelving track. The supporting rack has preferably the same width as the shelving rack of the storage.

According to an embodiment of the invention, the horizontal longitudinal picking bar has arranged to be moved up and down in perpendicular direction to the length direction of the horizontal longitudinal picking bar. The longitudinal picking bar may be moved along the main body of the load handling device. The advantage of the movable longitudinal picking bar is that the tyres of different size can be handled.

According to an embodiment of the invention, the load handling device is arranged to a rotatable base. In a preferred embodiment of the invention, two load handling devices are arranged parallel to the rotatable base. With the rotatable base, the load handling device can operate on two opposite storage shelving of the high bay warehouse. This enables faster handling of the tyres.

The invention relates also to a method for handling one, two or more tyres simultaneously in storage shelving of the high bay warehouse, where the tyres are brought in and stored and from where the tyres are taken. The typical method according to the invention comprises handling of one, two or more tyres simultaneously by using an arrangement according to the invention so that the last tyre in the longitudinal direction of the longitudinal picking bar is handled so that the longitudinal picking bar reaches between the tyre beads, and the rear support supports the tyre.

Typically, a high bay warehouse comprises a large number of different kinds of tyres. The tyres are arranged in horizontal storage shelving consecutively in an axial direction, so that the tyres stand in the upright position and their centres face to the output of the storage position. Preferably, the sidewalls of the tyres touch to each other and there is no gap between the tyres. The arrangement according to the invention is arranged to move in such a manner that the tyres are handled in axial direction from their centres. In that case, the tyres can be picked by their nominal size. The movements of the load handling device are substantially parallel to the axis of the tyres in such a manner that the longitudinal picking bar either removes the tyres from or positions the tyres to appropriate storage positions.

The method of the invention is especially based on that the tyres are picked up from the storage position so that the second end of the horizontal longitudinal picking bar reaches between the tyre beads of the last tyre to be picked up. With the tyre bead is here meant an edge of a tire that sits on the wheel. For example, if three tyres are wanted to be picked from the storage position, the load handling device is moved along the shelving track about two and half times a nominal size of the tyre. In that case, the longitudinal picking bar reaches between the tyre beads of the third tyre. The handling of the tyres according to the method is controlled by the nominal size of the tyre when no sensing is necessarily needed. The rear support supports the first tyre from its sidewall and prevents the tyres from falling.

The method enables the tyres to be easily separated from each other at the storage position without complex controlling systems. Besides, the method enables the tyres to be stored one after to another so that the sidewalls of the tyres touch to each other and there is no gap between the tyres.

According to an embodiment of the invention, the horizontal longitudinal picking bar reaches substantially in the middle of the tyre in the width direction of the tyre. This allows tolerance alternations of the tyres.

According to an embodiment of the invention, the horizontal longitudinal picking bar is supported against the inner surface of the centre of tyre. The inner surface of the centre of the tyre is freely in contact with the longitudinal picking bar from its centre hole without fastening or pressing of the tyre.

According to an embodiment of the invention the rear support is positioned to the correct position before picking up the tyres. According to an embodiment of the invention, a position of the rear support is altered on the basis of the number and/or the nominal size of the tyres to be handled. For example, if three tyres are wanted to be picked from the storage shelving, the rear support is moved to the position corresponding substantially two and a half times the nominal size of the tyre measured from the second end of the longitudinal picking bar. After positioning the rear support, the load handling device is moved forward along the shelving track in a direction parallel to the depth direction of the storage position. The longitudinal picking bar moves horizontally through the centre of the tyres standing in upright position one after the other in a storage shelving. When the first tyre in the longitudinal direction of the longitudinal picking bar touch the rear support, the load handling device stops. The longitudinal picking bar reaches now substantially in the middle of the last tyre to be picked in the width direction of the tyre. After that the longitudinal picking bar is moved up and the load handling device is moved backwards along the shelving track. The tyres hang freely on the longitudinal picking bar and the rear support supports the tyres from the sidewall and prevents them from falling.

According to an embodiment of the invention, the tyres are handled with a specific lifting curve so that at the same time when the horizontal longitudinal picking bar is moved up, the load handling device is moved backwards along the shelving track. This speed up the picking of the tyres. In the same way, when the load handling device is positioning the tyres, the longitudinal picking bar can be moved down at the same time when the load handling device is moved forward along the shelving track. This speed up the positioning of the tyres. Simultaneous movements also enable effective handling of the tyres.

According to an embodiment of the invention, the number of tyres handled simultaneously is 1 to 20.

According to an embodiment of the invention, the tyres from different storage positions are picked to the horizontal longitudinal picking bar during the same load. The tyres can be picked up from and drop off to several different storage positions. Also the tyres with different sizes can be handled during the same load. This increases the efficiency of the handling of the tyres in the high bay warehouse. The load handling unit can lay the tyres temporarily down on the supporting rack of the arrangement while changing the position on the shelving track. This enables the position of the tyres to be moved on the horizontal picking bar.

The typical arrangement and method according to the invention enables the picking of the tyres without identification/sensoring by using only the nominal size of the tyre. The incoming flow of the warehouse with upright positioning of the tyres enables the sensor-free operation of the load handling device due to the width of the tyres is known and the upright position of the tyres is not affecting to it. The reliability of handling tyres increases when the sensoring is not needed. In addition, the advantage of the arrangement and the method according to the invention is that more tyres can be handled simultaneously and that the sizes of the tyres that are handled simultaneously can variate. This removes the need to classify the tyres before storing because the different kinds and sizes of tyres can be handled simultaneously with the same arrangement and method.

The invention relates also to a high bay warehouse for tyres. A typical high bay warehouse according to the invention comprises a plurality of storage positions organised in storage shelving, a plurality of tyres or set of tyres arranged in at least some of the storage positions so that the tyres are arranged directly on the rack structure of the storage shelving in upright position one after the other, a stacker crane arranged to move at least two, preferably four directions, and at least one arrangement according to the invention arranged to the stacker crane for handling one or more tyres simultaneously in an axial direction of the tyres. An arrangement according to the invention is arranged to the stacker crane so that the movement directions of the load handling device may be substantially parallel to the depth direction of the storage position and the horizontal longitudinal picking bar can be moved horizontally.

According to an embodiment of the invention, the arrangement arranged to the stacker crane comprises two or more load handling devices moving along their own shelving tracks. Preferably, the arrangement comprises two load handling devices arranged parallel to each other. According to an embodiment of the invention, the stacker crane comprises a rotatable base and a shelving track of the arrangement has arranged to the rotatable base.

The high bay warehouse may comprise at least two storage positions, typically more than two storage positions, such as 5, 10, 15, 20, 30, 40, 50 or even 100 or more storage positions. The tyres are arranged in the storage position in an axial direction of the tyres so that the tyres stand in upright position one after to another in the depth direction of the storage position preferably so that the sidewalls of the tyres touch to each other.

The stacker crane is arranged to move in at least two directions which are preferably opposite directions, such as up and down. The stacker crane can also be arranged to move in two more directions, such as back and forth along the storage corridor between the storage shelves. Typically, these additional movement directions are perpendicular to the first and the second movement directions. In a high bay warehouse, where the storage is organised in shelves, i.e. there are storage positions that are next to one another and on top of one another, the stacker crane is preferably arranged to move in four directions so that it can be placed in front of all storage positions. The stacker crane can also be arranged to move in more than four directions if needed. According to an embodiment of the invention, the stacker crane comprises a rotatable base and a shelving track of the arrangement has arranged to the rotatable base.

In a high bay warehouse according to the invention, receiving of incoming tyres from the tyre production, positioning of the tyres to the storage positions and picking of the ordered tyres from the storage positions to be sent out from the storage are handled with the same stacker crane and the arrangement according to the invention arranged to it. Therefore, the operation of storage can be simplified and it is more efficient and faster. No separate storing or buffering areas or intermediate storages are required before the storage and after the storage for picking the tyres to be ordered. Besides, there is no need to classify the tyres before storing because different kinds and sizes of tyres can be handled simultaneously with the same arrangement.

The typical high bay warehouse according to the invention enables more efficient and reliable handling of one or more tyres at the same time by using a load handling device which picks and positions tyres in axial direction from the centre of the tyres by using the nominal size of the tyres.

BRIEF DESCRIPTION OF THE DRAWINGS

The invention will be described in more detail with reference to appended drawings, in which.

DETAILED DESCRIPTION OF THE INVENTION

Figure 1:
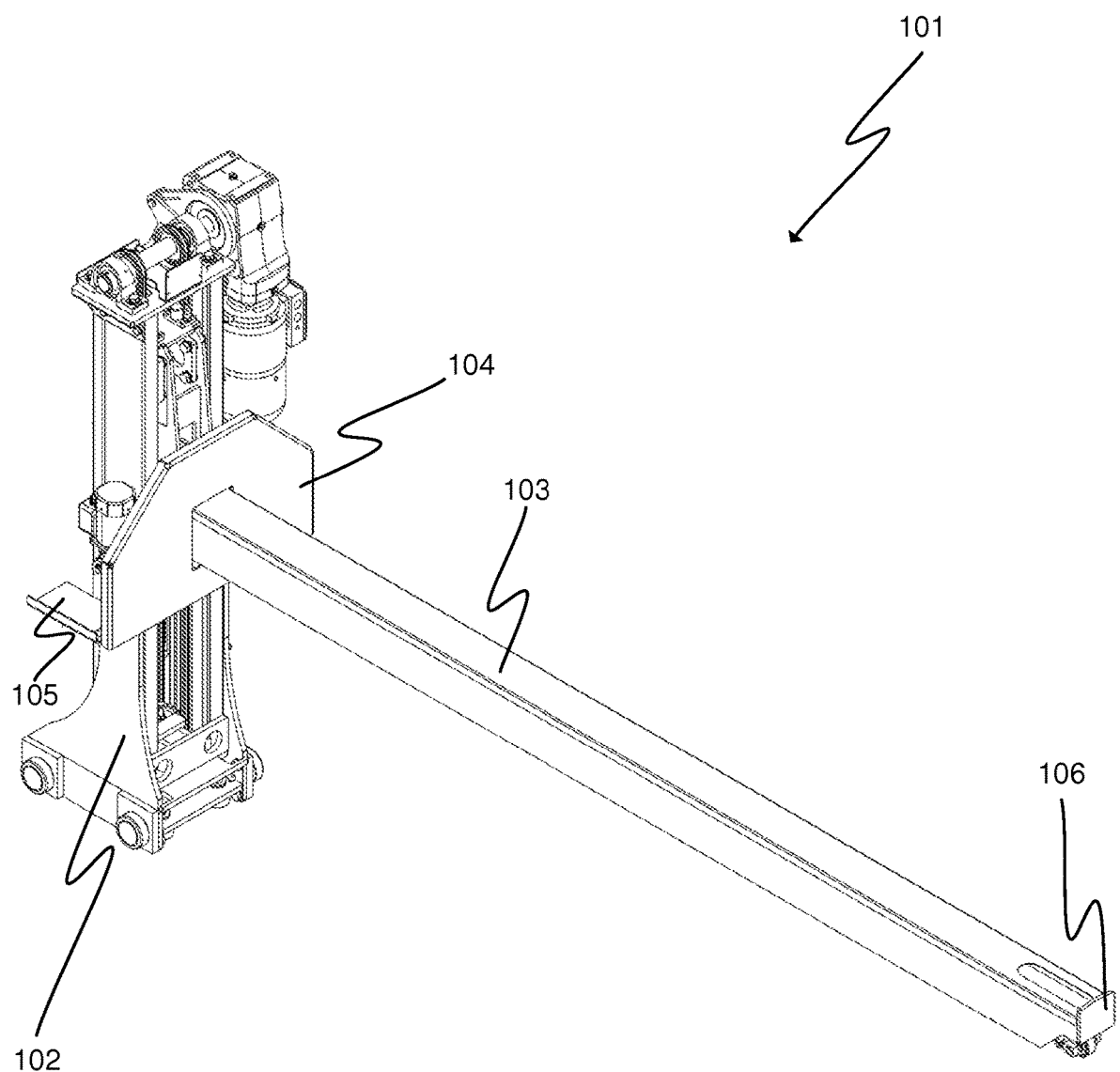
FIG. 1 illustrates a load handling device of an arrangement for handling tyres according to an embodiment of the invention.

FIG. 1 illustrates a load handling device of an arrangement for handling tyres according to an embodiment of the invention. The load handling device 101 comprises a substantially vertical main body 102 and a horizontal fixed-length longitudinal picking bar 103 having a first end and a second end. The longitudinal picking bar 103 is arranged to the main body 102 of the load handling device 101 from its first end in such a manner that the length direction of the longitudinal picking bar 103 is substantially perpendicular to the main body 102 of the load handling device 101. The horizontal longitudinal picking bar 103 is arranged to move up and down along the main body 102 of the load handling device 101. The horizontal longitudinal picking bar 103 is arrangeable through the centre of the tyres when the tyres are stored in a storage shelving in upright position one after the other. The longitudinal picking bar 103 can handle one or more tyres simultaneously in an axial direction of the tyres.

The load handling device 101 comprises also a rear support 104 arranged to the longitudinal picking bar 103. The rear support 104 has a plate like structure and it has been arranged substantially perpendicular to the length direction of the longitudinal picking bar 103. The rear support 104 keeps the tyres in their upright position on the longitudinal picking bar 103 and prevents them from falling during handling of the tyres. The size of the rear support 104 can be adjusted in a height direction with extension plates 105 arranged to both sides of the lower part of the rear support 104. The extension plates 105 are movable and can be turned to form an extension to the rear support 104 if needed. The rear support 104 is arranged to be movable in the length direction of the longitudinal picking bar 103. The position of the rear support 104 can be altered on the basis of the number and/or nominal size of the tyres to be handled.

The longitudinal picking bar 103 comprises also a support plate 106 arranged to the second end of the longitudinal picking bar 103. The support plate 106 is arranged substantially perpendicular to the length direction of the longitudinal picking bar 103. The support plate 106 can aid the load handling device 101 to separate the tyres when picking from the storage and prevent them from dropping from the longitudinal picking bar 103.

Figure 2:
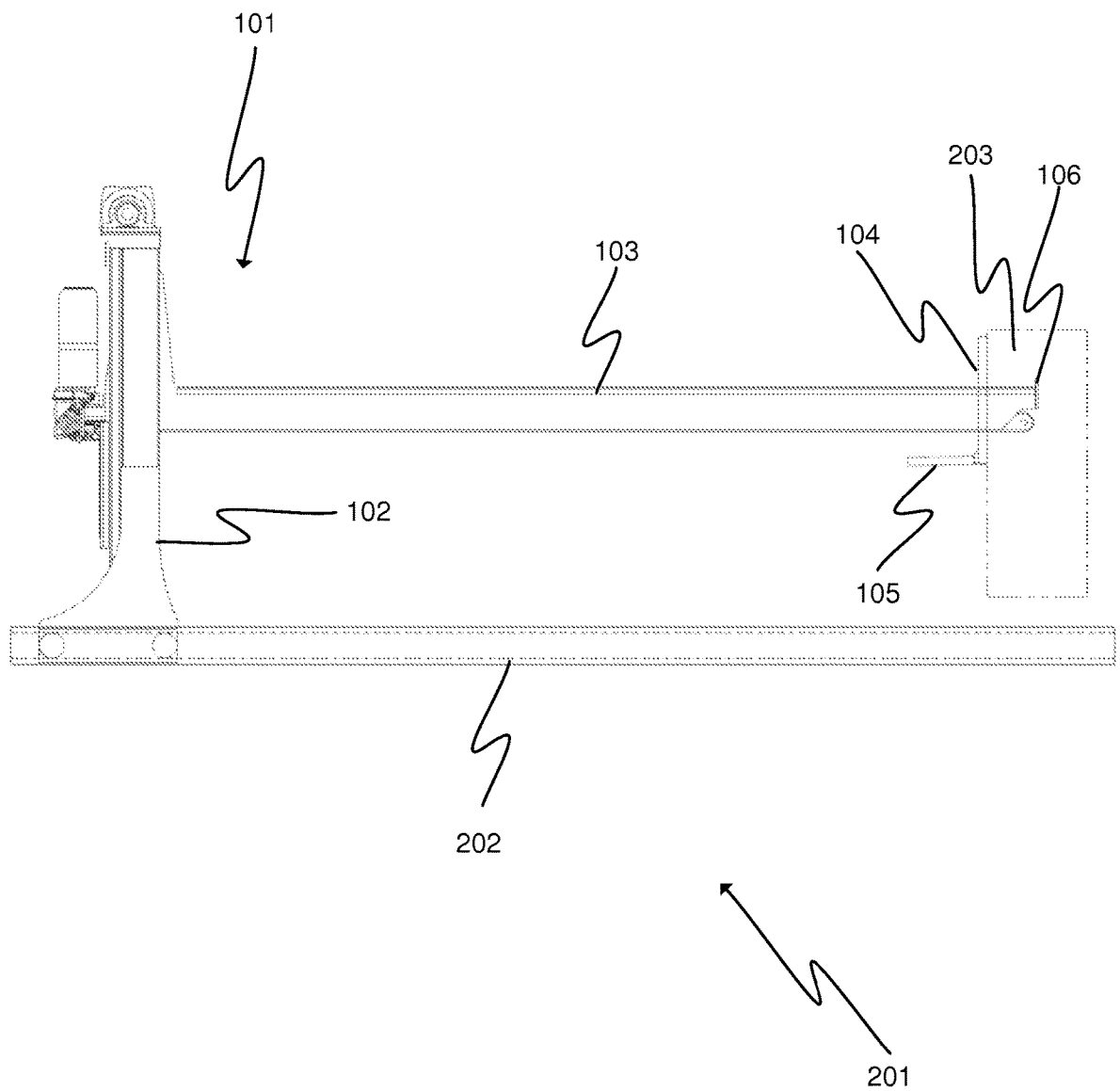
FIG. 2 illustrates an arrangement of handling tyres according to an embodiment of the invention.

FIG. 2 illustrates an arrangement for handling tyres according to an embodiment of the invention. The arrangement 201 comprises an elongated shelving track 202 and the load handling device 101 of FIG. 1. The load handling device 101 is arranged to move back and forth along the shelving track 202 in a direction parallel to the depth direction of the storage position. The load handling device 101 comprises the horizontal longitudinal picking bar 103 arranged from its first end to the main body 102 of the load handling device 101 and the movable rear support 104 arranged to the longitudinal picking bar 103. The longitudinal picking bar 103 is arranged to move up and down along the main body 102 of the load handling device 101. The rear support 104 may comprise the extension plate 105 on both sides of the rear support 104 and a detecting plate on a surface against the tyre 203, which detects the contact of the tyre 203 during picking.

With the horizontal longitudinal picking bar 103, one or more tyres 203 stored in storage shelving of the high bay warehouse in their upright position one after the other can be easily handled. The tyre 203 is handled in the axial direction in such a manner that the longitudinal picking bar 103 is arranged to the centre of the tyre 203. The tyre 203 hangs freely against the longitudinal picking bar 103 without fastening or pressing of the tyre 203 and the rear support 104 supports it from falling.

When picking one or more tyres 203 from the storage position, the rear support 104 is first moved to the position corresponding to the number and/or nominal size of the tyres 203 wanted to be picked. The load handling device 101 is then moved along the shelving track 202 in such a manner that the horizontal longitudinal picking bar 103 goes through the centre of the tyres 203. When the first tyre 202 in the storage position contacts with the detecting plate of the rear support 104, the movement of the load handling device 101 stops. The second end of the longitudinal picking bar 103 reaches now essentially to the middle of the last tyre 203 to be picked in a width direction of the tyre 203. The longitudinal picking bar 103 is then moved up and the same time the load handling device 101 is moved backwards along the shelving track 202. The rear support 104 supports the sidewall of the picked tyre 203 and prevents the tyre 203 from falling. The extension plates 105 of the rear support 104 can be turned down to be as an extension to the rear support 104 if needed.

Figure 3:
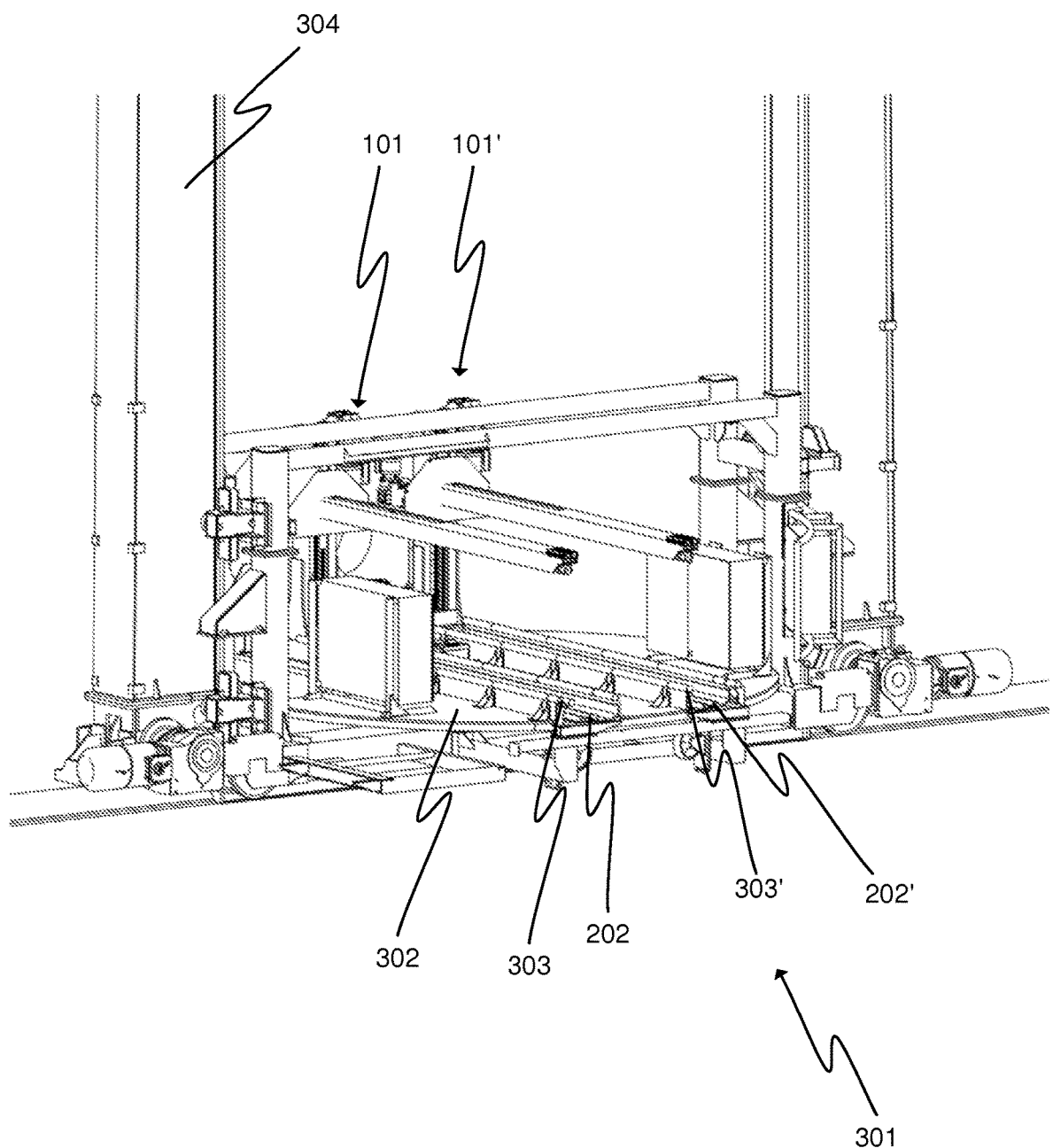
FIG. 3 illustrates an arrangement for handling tyres according to another embodiment of the invention.

FIG. 3 illustrates an arrangement for handling tyres according to another embodiment of the invention. In the arrangement 301 two arrangements 201 of FIG. 2 are arranged to a rotatable base 302. The arrangement 301 comprises the first load handling device 101 arranged to move back and forth along the first shelving track 202 and the second load handling device 101' arranged to move back and forth along the second shelving track 202'. The shelving tracks 202, 202' are arranged next to each other to a rotatable base 302 in such a manner that the distance of the load handling devices 101, 101' moving along the shelving tracks 202, 202' remains essentially constant. The support racks 303, 303' are arranged to both sides of the shelving tracks 202, 202'. The arrangement 301 is arranged to the stacker crane 304 which is arranged to move in four directions between storage shelves. The rotatable base 302 enables the load handling devices 101, 101' to handle the tyres from the both sides of the stacker crane 304, i.e. from two opposite storage shelves.

Figure 4:
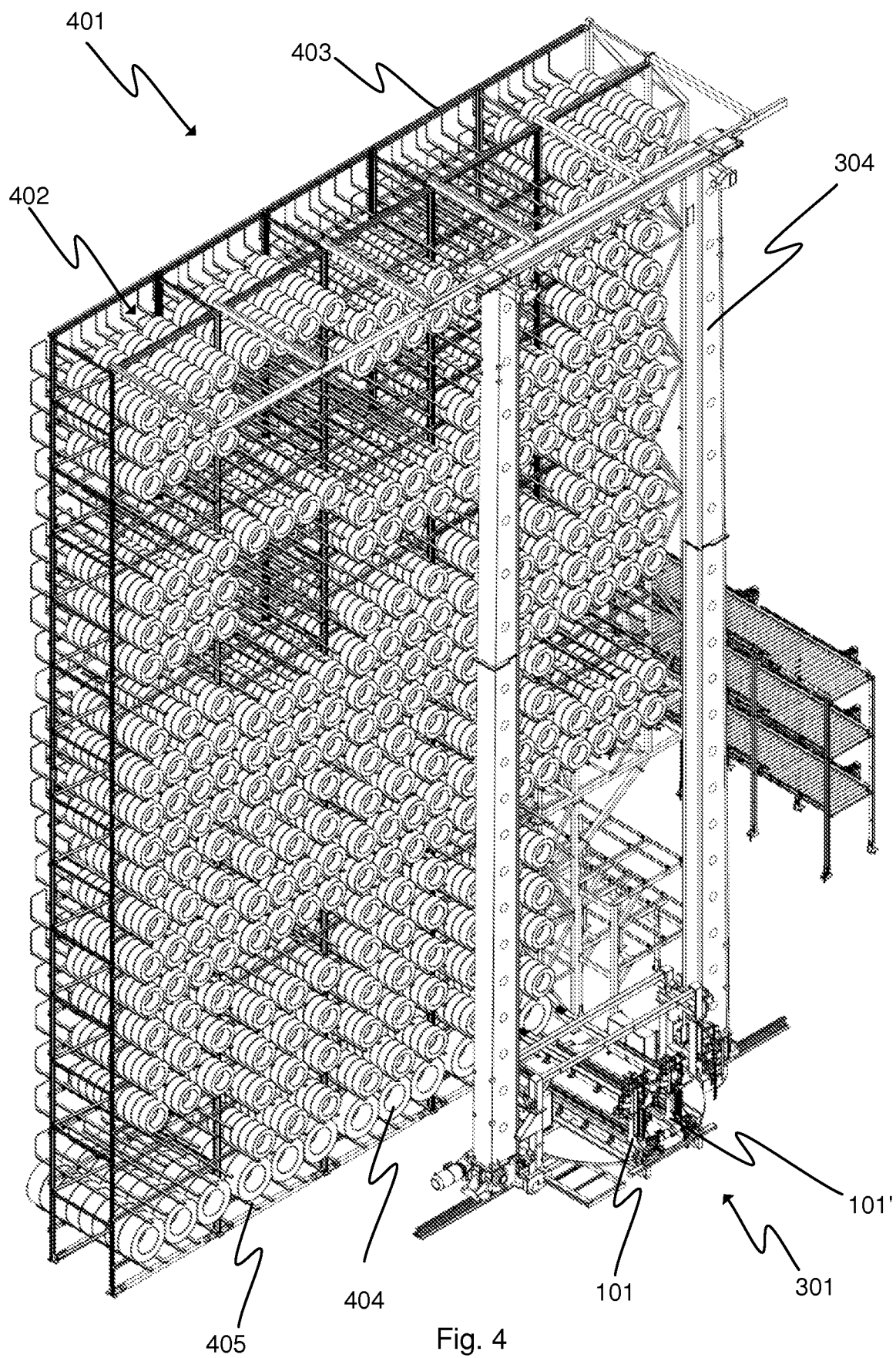
FIG. 4 illustrates a high bay warehouse according to an embodiment of the invention.

FIG. 4 illustrates a high bay warehouse according to an embodiment of the invention. The high bay warehouse 401 comprises a plurality of storage positions 402 organised in storage shelving 403 where the storage positions 402 are next to one another and top of one another. A plurality of tyres 404 are arranged in the storage positions 402. The tyres 404 are placed into the storage positions 402 in an axial direction one after to another in such a manner that the tyres 404 stand in upright position and the sidewall of the only one tyre 404 is visible from each storage position 402. The storage shelving 403 has a rack structure 405 on which the tyres 404 are directly arranged. The storage positions 402 are accessible through only one side, which is designated as the output of the storage position 402. The output of the storage position 402 is thus the location from which the horizontal longitudinal picking bar of the load handling device 101, 101' can enter the storage position 402 for picking up or for positioning one or more tyres 404.

The high bay warehouse 401 comprises also the stacker crane 304 arranged to move up and down and back and forth along the storage corridor between the storage shelves 403 so that it can be placed in front of all storage positions 402. The arrangement 301 of FIG. 3 is arranged to the stacker crane 304 so that the movement directions of the load handling devices 101, 101' are substantially parallel to the depth direction of the storage positions 402 and the longitudinal picking bars can be moved horizontally. This enables the longitudinal picking bar to handle the tyres 404 in axial direction from the centre holes of the tyres 404.

In the high bay warehouse 401, the receiving of the incoming tyres 404 from the production, positioning of the tyres 404 to the storage positions 402 and picking of the tyres 404 from the storage positions 402 to be sent out from the storage are handled with the same stacker crane 304 and arrangement 301 arranged to it.

The invention claimed is:

1. An arrangement for handling one or more tyres simultaneously in storage shelving of a high bay warehouse, where the tyres are brought in and stored and from where the tyres are taken, wherein the arrangement comprises a shelving track and a load handling device arranged to move along the shelving track, which load handling device comprises:
   a horizontal longitudinal picking bar having a first end and a second end and which longitudinal picking bar is arranged to handle one or more tyres simultaneously in an axial direction of the tyres when the tyres stand in upright position one after the other so that the longitudinal picking bar is arrangeable to the centre of the tyre, and
   a rear support arranged to the longitudinal picking bar, wherein a size of the rear support is arranged to be adjustable with extension plates in a height direction which is perpendicular to the length direction of the horizontal longitudinal picking bar, so that the rear support can be fitted with the size of the tyres to be handled, wherein the extension plates are movable so that they can be turned to a position to form an extension to the rear support and turned away from said position.

2. The arrangement according to claim 1, wherein the rear support is arranged to be movable in the longitudinal direction of the horizontal longitudinal picking bar.

3. The arrangement according to claim 1, wherein the rear support has a plate like structure and it has arranged substantially perpendicular to the length direction of the horizontal longitudinal picking bar.

4. The arrangement according to claim 1, wherein the longitudinal picking bar has arranged to be moved up and down in perpendicular direction to the length direction of the horizontal longitudinal picking bar.

5. The arrangement according to claim 1, wherein a length of the horizontal longitudinal picking bar is arranged to be adjustable, wherein the horizontal longitudinal picking bar is telescopic.

6. The arrangement according to claim 1, wherein the arrangement comprises two shelving tracks and load handling devices arranged parallel to each other.

7. A method for handling one or more tyres simultaneously in storage shelving of a high bay warehouse, where the tyres are brought in and stored and from where the tyres are taken, the method comprising
   handling one or more tyres simultaneously by using the arrangement according to claim 1 so that the last tyre in the longitudinal direction of the longitudinal picking bar of the arrangement is handled so that the second end of the longitudinal picking bar reaches between the tyre beads, and the rear support of the arrangement supports the tyre.

8. A method according to claim 7, comprising reaching, by the horizontal longitudinal picking bar, substantially in the middle of the tyre in the width direction of the tyre.

9. A method according to claim 7, comprising supporting the horizontal longitudinal picking bar against the inner surface of the centre of tyre.

10. A method according to claim 7, comprising altering a position of the rear support on the basis of the number and/or the nominal size of the tyres to be handled.

11. A method according to claim 7, comprising handling the tyres with a specific lifting curve so that at the same time when the horizontal longitudinal picking bar is moved up, the load handling device is moved backwards along the shelving track.

12. A method according to claim 7, comprising handling simultaneously 1 to 20 tyres.

13. A method according to claim 7, comprising picking the tyres from different storage positions to the horizontal longitudinal picking bar during the same load.

14. A high bay warehouse comprising
   a plurality of storage positions organised in storage shelving,
   a plurality of tyres or set of tyres arranged in at least some of the storage positions, so that the tyres are arranged directly on the rack structure of the storage shelving in upright position one after the other,
   a stacker crane arranged to move at least two, preferably four directions, and
   at least one arrangement according to claim 1 arranged to the stacker crane for handling one or more tyres simultaneously in an axial direction of the tyres.

15. The high bay warehouse according to claim 14, wherein the stacker crane comprises a rotatable base and a shelving track of the arrangement has arranged to the rotatable base.

* * * * *